United States Patent [19]

Saitou

[11] Patent Number: 4,997,295
[45] Date of Patent: Mar. 5, 1991

[54] ROLLING BEARING

[75] Inventor: Tsuyoshi Saitou, Fujisawa, Japan

[73] Assignee: Nippon Seiko Kabushiki Kaisha, Tokyo, Japan

[21] Appl. No.: 493,889

[22] Filed: Mar. 15, 1990

[30] Foreign Application Priority Data

Mar. 17, 1989 [JP] Japan .................................. 1-65166

[51] Int. Cl.$^5$ ..................... F16C 33/62; F16C 33/56
[52] U.S. Cl. .................................. 384/492; 384/527; 384/907
[58] Field of Search ............... 384/490, 492, 527, 625, 384/907, 908, 909

[56] References Cited

U.S. PATENT DOCUMENTS

| 3,212,834 | 10/1965 | Mayer et al. | 384/492 X |
| 3,567,504 | 3/1971 | Hopkins et al. | 384/492 X |
| 4,193,645 | 3/1980 | Baker et al. | 384/909 X |
| 4,293,171 | 10/1981 | Kakumoto | 384/492 |
| 4,956,858 | 9/1990 | Upadhya | 384/625 X |

Primary Examiner—Thomas R. Hannon
Attorney, Agent, or Firm—Basile and Hanlon

[57] ABSTRACT

A rolling bearing includes an outer race, an inner race, many balls interposed between the outer race and the inner race, and a retainer for holding the balls at equal intervals in a circumferential direction of the outer peripheral surface of the inner race. At least the balls among the outer race, the inner race, and the ball are coated with a lubricating film, and the retainer is made from linear-chain polyphenylene sulfide as a matrix and containing at least a fluoroplastic by 10 to 60 wt %.

4 Claims, 2 Drawing Sheets

ROLLING BEARING

BACKGROUND OF THE INVENTION

1. Field of the Invention

The present invention relates to rolling bearings and, in particular, to a rolling bearing used in equipment used in vacuum, or equipment which is difficult to be lubricated with oil and grease, such as office automation equipment, information equipment, or the like.

2. Description of the Prior Art

In the prior art, a self-lubricating rolling bearing has been used as a rolling bearing in an environment not suitable for lubrication with oil or grease. In this rolling bearing, a lubricating material is used which does not generate a volatile substance which contaminates the environment. For example, an outer race, an inner race, and rolling members of the rolling bearing are covered with a coating of molybdenum disulfide (Mo $S_2$). Furthermore, it has been proposed to form a silver film or a lead film on a rolling contact surface (Japanese Utility Model Laid-Open Publication No 58-99521), or to apply a plating of a lubrication metal, such as gold, silver or the like on a surface of rolling members (Japanese Patent Laid-Open Publication No. 5142847).

With regard to a retainer used in such bearings, it has been formed of a resin composite material which contains polytetrafluoroethylene (PTFE) mixed with glass fiber (GF) or molybdenum disulfide (Mo $S_2$). Alternatively, the retainer has been formed by machining a sinter material containing tungsten disulfide (W $S_2$), and Mo $S_2$, mixed with a metal, such as copper (Cu), tin (Sn), tantalum (Ta), and the like.

However, a rolling bearing which exhibits satisfactory lubricating properties under any conditions and which has a long life cannot be achieved only by coating the surface or contact surface of the rolling members with a material having good lubricating properties, such as Mo $S_2$, gold, silver, lead, or the like, or only by mixing a material of good lubricating properties with the material of the retainer In particular, in a situation in which the self-lubricating properties are required as mentioned above, in order to meet the requirements for wear resistance, low torque, and the like, it is indispensable to take into consideration a relationship between the retainer and the rolling members in which a sliding movement is involved in their operation. Because, in a slide contact, torque is larger than in a rolling contact, and a coated lubricating film is apt to be peeled off.

Furthermore, even if a material having self-lubricating properties is utilized for the retainer, an increase in cost will be encountered if a complicated shape of the retainer is to be formed by machining. Moreover, it is difficult to machine the retainer into a shape which allows the retainer to satisfactorily embrace the rolling members, and problems will arise in which the torque is increased or the assembling becomes inconvenient.

SUMMARY OF THE INVENTION

The present invention was made in view of the problems mentioned above, and it is an object of the invention to provide a rolling bearing which is a combination of a retainer formed by injection molding a heat resisting resin filled with a lubricating material and rolling members coated with a lubricating film so that the rolling bearing can exhibit satisfactory self-lubricating properties which cannot be achieved by providing lubricating properties to only one member of the combination. This enables a long service life to be maintained under a severe environment, for example, under high vacuum, high temperature and great temperature change such as in the outer space, and still can be manufactured at low cost.

In order to achieve the above object, a rolling bearing in the present invention comprises an outer race, an inner race, a plurality of rolling members interposed between the outer race and the inner race, and a retainer for holding the rolling members at equal intervals in a circumferential direction on an outer peripheral surface of the inner race. At least the rolling members among the outer race, the inner race, and the rolling members are coated with a lubricating film. The retainer is made from linear-chain polyphenylene sulfide as a matrix and containing at least a fluoroplastic by 10 to 60 wt%.

The lubricating film may be formed by sputtering.

In the present invention, since at least the rolling members are coated with a lubricating film, and at the same time, the retainer is formed of a linear chain polyphenylene sulfide and fluoroplastic, the lubricating properties are provided to both the rolling members and the retainer, both of which slide relative to each other. Accordingly, the rolling bearing is provided with sufficient lubricating properties, and low torque and long life can be achieved.

Where the content of the fluoroplastic is below 10 wt%, the lubricating properties of the molded product will be insufficient and satisfactory extending long life will not be attained. On the other hand, if it exceeds 60 wt%, molding will be impossible.

When the retainer is injection molded, mass production will be possible and the cost will be lowered.

The lubricating film is formed by sputtering. In this case, the lubricating substance is not damaged chemically, and its lubricating properties can be maintained. At the same time, the retainer coated with the lubricating film having adhesive properties can be mass produced at a low temperature.

DESCRIPTION OF THE PREFERRED EMBODIMENTS

Figure 1:
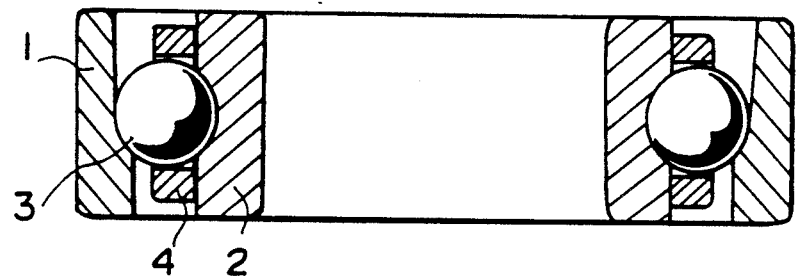
FIG. 1 is a sectional view of an embodiment of a rolling bearing according to the present invention.

FIG. 1 shows an angular contact ball bearing to which the present invention is applied. The ball bearing includes an outer race 1, an inner race 2, a plurality of rolling members (balls) 3 rollably interposed between the outer race 1 and the inner race 2, and a retainer 4 for embracing and holding the balls 3 at equal intervals in a circumferential direction on the outer peripheral surface of the inner race 2.

In the ball bearing structured as mentioned above, with respect to the outer race 1, the inner race 2, and the balls 3, for the purpose of life test, all of these components are coated with a lubricating film on the one hand, and only the balls 3 are coated with the lubricating film on the other hand. With respect to the retainer 4, a retainer which is injection molded by using a material containing linear-chain polyphenylene sulfide (L-PPS) as a matrix and containing fluoroplastic not less than a predetermined amount is prepared. Ball bearings (Examples 1 to 9, Table 1) obtained by varying combinations of films and materials for the components were subjected to life tests.

Figure 2:
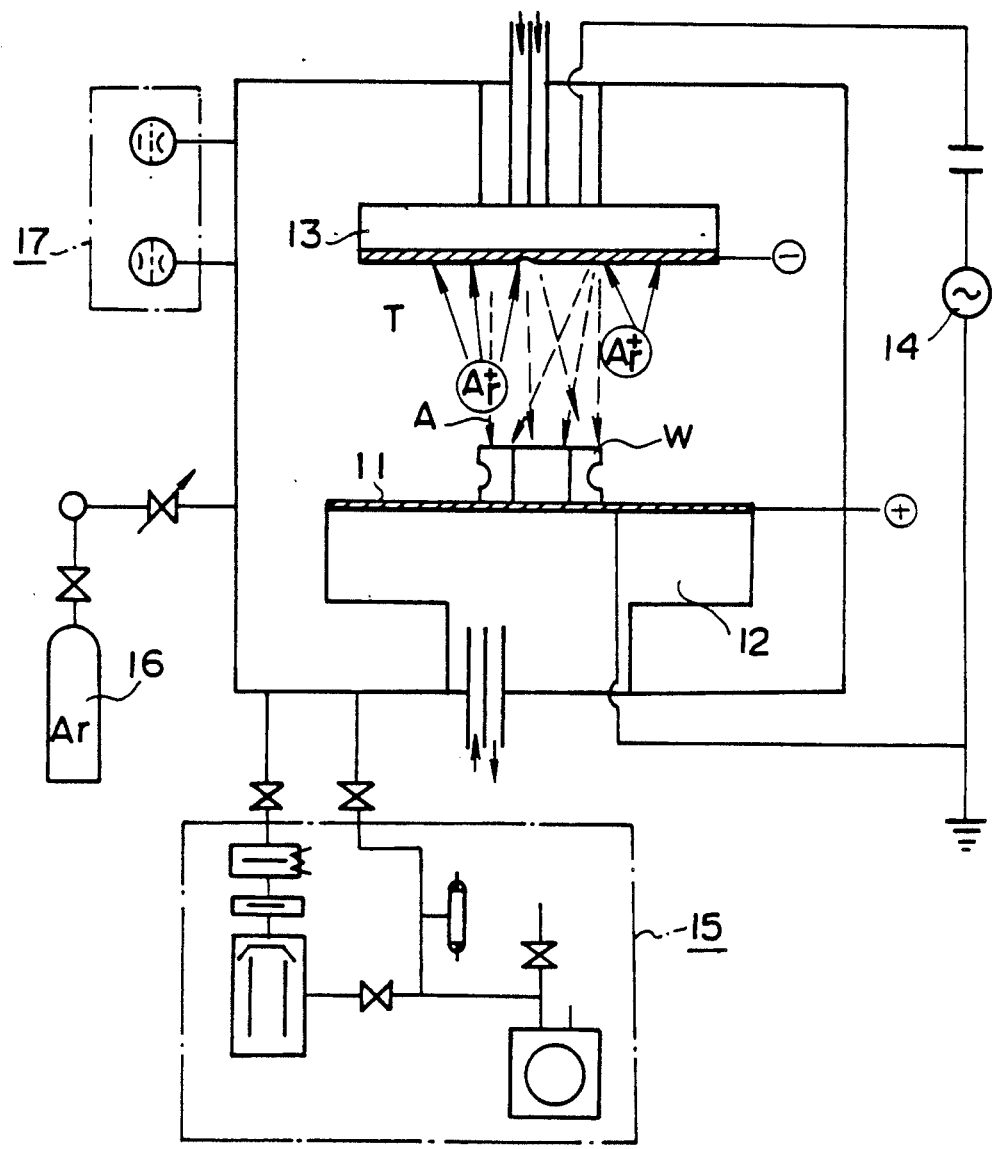
FIG. 2 is a schematic diagram of a sputtering apparatus.

In coating the lubricating film, two kinds of coating materials of $MoS_2$ and $WS_2$ were used, and a high frequency sputtering apparatus as shown in FIG. 2 was used. Specifically, an object W to be coated is placed on a table 12 provided with an anode 11, and a cathode 13 having for example $MoS_2$ is positioned as a target T opposed to the anode 11. Glow discharge was made to occur between both of the electrodes 11 and 13 in an atmosphere of low pressure argon (Ar) at a pressure of 4 Pa. Sputtering atoms A emitted from the target material under the bombardment of argon ions (Ar+) generated by the glow discharge are deposited on a surface of the object W to be coated to thereby form a lubricating film. A thickness of the lubricating film is made not larger than 1 micro-meters ($10^{-6}$m). In FIG. 2, the reference numeral 14 designates a high frequency power supply, reference numeral 15 designates an exhaust system, reference numeral 16 designates an Ar bottle, reference numeral 17 designates a vacuum gauge, and reference numeral 18 designates a cooling water path. The materials used for the retainer 4 include L-PPS (produced by Kureha Kagaku Kogyo K.K., Fortoron (trademark KPS W214), PTFE (produced by ICI Company, Furuon (trademark L169), and totalaromatic polyester (produced by Sumitomo Kagaku Kogyo K.K., Ekonorl (trademark E-101) (S type). The injection molding machine is manufactured by Toshiba Kikai K.K. Resin temperature is at 310° to 320° C., and the temperature of the metal mold is at 140° to 145° C.

In a first example, all of the outer race 1, the inner race 2, and the balls 3 are coated with $MoS_2$. The retainer 4 is an injection mold product containing PTFE, by 30 wt%, L-PPS by 50 wt%, and total aromatic polyester by 20 wt% (this retainer is represented by a symbol H1 in Table 1).

In a second example, all of the outer race 1, the inner race 2, and the balls 3 are coated with $MoS_2$ as in the first example. The retainer 4 is an injection mold product containing PTFE by 30 wt%, and L-PPS by 70 wt% (this retainer is represented by symbol H2 in Table 1).

In a third example, all of the outer race 1, the inner race 2, and the balls 3 are coated with $MoS_2$ as in the first example. The retainer 4 is an injection mold product containing PTFE by 50 wt%, and L-PPS by 50 wt% (this retainer is represented by a symbol H3 in Table 1).

In a fourth example, only the balls 3 are coated with $MoS_2$. The retainer 4 is the same as in the second example (H2).

In a fifth example, also only the balls 3 are coated with $MoS_2$. The retainer 4 is the same as in the second example (H3).

In a sixth example, $WS_2$ is used as the coating material, and all of the outer race 1, the inner race 2, and the balls 3 are coated. The retainer 4 is the same as in the second example (H2).

In a seventh example, all of the outer race 1, the inner race 2, and the balls 3 are coated with $WS_2$. The retainer 4 is the same as in the third example (H3).

In an eighth example, only the balls 3 are coated with $WS_2$. The retainer 4 is the same as in the second example (H2).

In a ninth example, only the balls 3 are coated with $WS_2$. The retainer 4 is the same as in the third example (H3).

Table 1 shows the results of life tests conducted for each example of the ball bearings structured as mentioned above.

Figure 3:
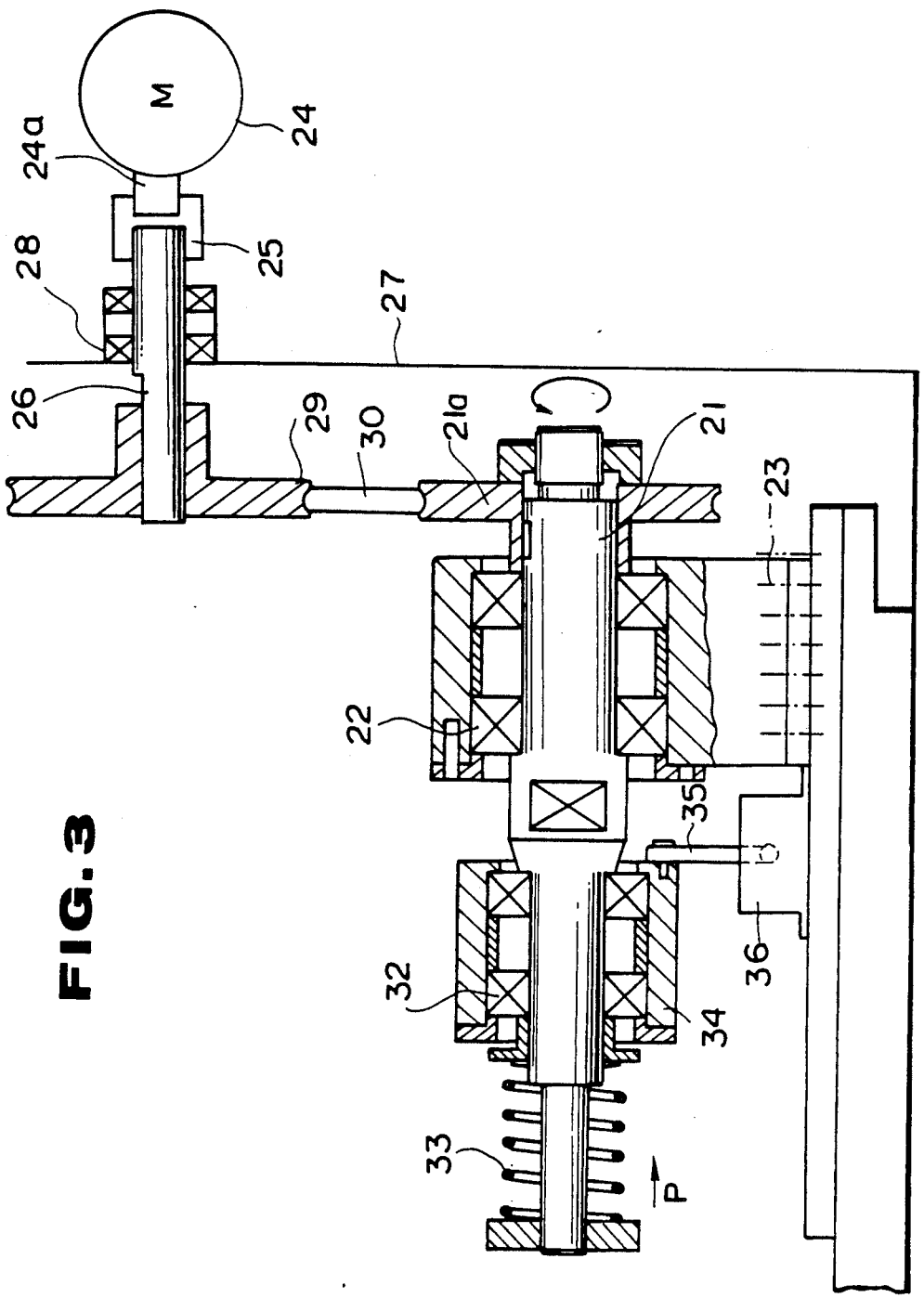
FIG. 3 is a sectional view of a life test apparatus.

FIG. 3 shows a life test apparatus, in which a rotary shaft 21 is rotatably supported by a base 23 through a support bearing 22, and a pulley 21a is fixed to a rear end portion of the rotary shaft 21. The rotary shaft 21 is driven by a motor 24 disposed outside of a test room. An output shaft 24a of the motor 24 is connected to a power transmission shaft 26 through a coupling 25. The power transmission shaft 26 penetrates through a partition wall 27, where it is sealed by a magnetic fluid seal 28. The rotation of a pulley 29 attached to an end of the power transmission shaft 26 is transmitted to the rotary shaft 21 through a belt 30 and a pulley 21a.

The ball bearing 32 under test is mounted about the rotary shaft 21. The ball bearing 32 is preloaded with an axial load P by means of a preloading spring 33. A torque of the ball bearing 32 is detected by a load cell 36 connected to a casing 34 through a transmission plate 35.

The conditions for testing are as follows.

The atmosphere temperature in the test room is at a room temperature, the degree of vacuum is $2 \times 10^{-5}$Pa, and the number of rotations is 2500 rpm. The life is determined from a total number of rotations of the inner race until the lubricating film having a thickness of 1 micro-meter is worn out and, as a result of this, the torque detected by the load cell 36 reaches a predetermined value.

TABLE 1

| EXAMPLE | INNER RACE | OUTER RACE | BALLS | RETAINER | LIFE (rev) |
|---|---|---|---|---|---|
| 1 | $MoS_2$ | $MoS_2$ | $MoS_2$ | H1 | $3 \times 10^8$ or more |
| 2 | $MoS_2$ | $MoS_2$ | $MoS_2$ | H2 | $3 \times 10^8$ or more |
| 3 | $MoS_2$ | $MoS_2$ | $MoS_2$ | H3 | $3 \times 10^8$ or more |
| 4 | none | none | $MoS_2$ | H2 | $3 \times 10^8$ or more |
| 5 | none | none | $MoS_2$ | H3 | $3 \times 10^8$ or more |
| 6 | $WS_2$ | $WS_2$ | $WS_2$ | H2 | $3 \times 10^8$ or more |
| 7 | $WS_2$ | $WS_2$ | $WS_2$ | H3 | $3 \times 10^8$ or more |
| 8 | none | none | $WS_2$ | H2 | $3 \times 10^8$ or more |
| 9 | none | none | $WS_2$ | H3 | $3 \times 10^8$ or more |

The life test for each of the examples is terminated at a time when an upper limit test time is exceeded.

A similar life test was conducted with respect to ball bearings in which, for the purpose of comparison, two kinds of coatings including $MoS_2$ and $WS_2$ were applied to the inner race 2, the outer race 1, and the balls 3 similar to the above-mentioned examples. However, the retainer 4 has a different structure.

The structure of the retainer 4 in these examples is as follows.

A first comparison example: a bar material containing PTFE 50 wt%, GF 25 wt%, and Mo $S_2$ 25 wt% is machined to shape. This retainer is represented by a symbol H 11 in Table 2. Due to the machining, the number of manufacturing processes is increased and the cost is high.

A second comparison example: a HBsCL (high-strength brass) is machined to a shape. This retainer is represented by a symbol H 12 in Table 2. Due to the machining, the number of machining processes is increased and the cost is high.

A third comparison example: an alloy containing W $S_2$ 50 wt%, and the remainder of Cu, Sn, and Ag (this alloy is produced by Toshibe Tangaroi K.K., SL05) is machined to a shape. This retainer is represented by a symbol H 13 in Table 2. Due to the machining, the number of machining processes is increased and the cost is high. Furthermore, the material is also expensive since it contains Ag.

Fourth to twelfth comparison examples: an injection mold product containing PTFE 5 wt% and L-PPS 95 wt%. This retainer is represented by a symbol H 14 in Table 2. Although it is inexpensive because it is an injection mold product, the content of the fluoroplastic is small.

The result of the life test for each of the comparison examples is shown in Table 2.

TABLE 2

| COMPARISON EXAMPLE | INNER RACE | OUTER RACE | BALLS | RETAINER | TEMP. °C. | LIFE |
|---|---|---|---|---|---|---|
| 1 | Mo $S_2$ | Mo $S_2$ | Mo $S_2$ | H 11 | room temp. | $1 \times 10^8$ |
| 2 | Mo $S_2$ | Mo $S_2$ | Mo $S_2$ | H 12 | room temp. | $1 \times 10^6$ |
| 3 | Mo $S_2$ | Mo $S_2$ | Mo $S_2$ | H 13 | room temp. | $3 \times 10^8$ |
| 4 | Mo $S_2$ | Mo $S_2$ | Mo $S_2$ | H 14 | room temp. | $5 \times 10^6$ |
| 5 | Mo $S_2$ | Mo $S_2$ | Mo $S_2$ | H 14 | 150° | $1 \times 10^6$ |
| 6 | none | none | Mo $S_2$ | H 14 | room temp. | $4 \times 10^6$ |
| 7 | none | none | Mo $S_2$ | H 14 | 150° | $1 \times 10^5$ |
| 8 | none | none | none | H 14 | room temp. | $1 \times 10^4$ |
| 9 | W $S_2$ | W $S_2$ | W $S_2$ | H 14 | room temp. | $5 \times 10^6$ |
| 10 | W $S_2$ | W $S_2$ | W $S_2$ | H 14 | 150° | $9 \times 10^6$ |
| 11 | none | none | W $S_2$ | H 14 | room temp. | $4 \times 10^6$ |
| 12 | none | none | W $S_2$ | H 14 | 150° | $8 \times 10^6$ |

In Table 2, the temperature (°C.) was measured at the outer race of the bearing.

Table 1 and Table 2 show that the rolling bearing in each of the examples according to the present invention has a longer life than any of the comparison examples.

Among the comparison examples, the third comparison example, Table 2, has the longest life, however, an expensive material is used for the retainer, and further, the cost is very high because it requires machining. The fourth to twelfth comparison examples, Table 2, are low in machining cost because of the use of an injection mold product, however, they have a short life since the content of the lubricating resin (PTFE) compounded in the retainer is as small as 5 wt%. In the eighth comparison example, a coating is applied to any of the inner race, the outer race, and the balls, and the torque was large from the beginning of the operation of the test apparatus. Moreover, during the operation, an oxide film was formed on a bare surface of the balls, etc., to rapidly increase the torque, and consequently, the life was very short. It will be apparent from the above results that in order to extend the life under a severe environment of high vacuum and high temperature, it is effective to use the retainer compounded with sufficient amount of lubricating resin, and, at the same time, to apply the coating of a lubricating film to at least the rolling members.

The means for forming the lubricating films on the rolling members and the inner and outer races is not limited to the sputtering, as vacuum deposition, ion plating, and the like can also be employed.

Furthermore, the composition of the lubricating film is not limited to Mo $S_2$ or W $S_2$, as lead, silver, gold or the like may be used.

The object to which the present invention is applied is not limited to the type of ball bearing described in each of the examples, and other types of ball bearings and rolling bearings are included within the scope of the present invention.

As described above, in the present invention, at least the rolling members of the outer race, the inner race, and the rolling members of a rolling bearing are coated with a lubricating film, and at the same time, the retainer is formed by an injection mold product containing a fluoroplastic having high lubricating properties by 10 to 60 wt% in linear-chain polyphenylene sulfide having high heat-resistant properties. As a result, it is possible to provide satisfactory self-lubricating properties to both the rolling members and the retainer, both of which exhibit a sliding movement relative to each other. Accordingly, an advantage is provided in that the rolling bearing of the present invention provides a low torque and a long life under a severe environment of high vacuum and high temperature, and still is inexpensive in cost.

What is claimed is:

1. In a rolling bearing formed of an outer race, an inner race, a plurality of rolling members interposed between said outer race and said inner race, and a retainer for holding said rolling members at equal intervals in a circumferential direction on an outer peripheral surface of said inner race, the improvement comprising:
    at least said rolling members of said outer race, said inner race, and said rolling members are coated with a lubricating film; and
    said retainer is made from linear-chain polyphenylene sulfide as a matrix and containing at least a fluoroplastic by 10 to 60 wt%.

2. The improvement in a rolling bearing according to claim 1, wherein said lubricating film is formed by sputtering means.

3. The roller bearing according to claim 1 wherein said lubricating film is comprised of molybdenum disulfide (MoS$_2$).

4. The roller bearing according to claim 1 wherein said lubricating film is comprised of tungsten disulfide (WS$_2$).

* * * * *